Sept. 15, 1964     J. M. DREES ETAL     3,148,733
ROTOR
Filed Feb. 26, 1963     2 Sheets-Sheet 1
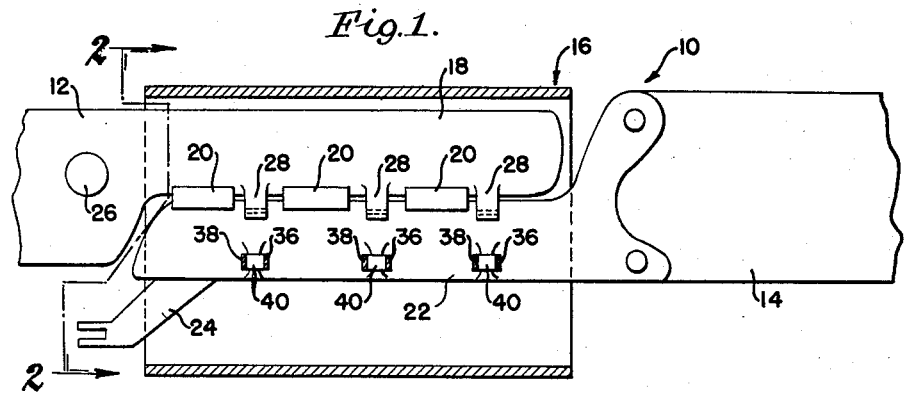
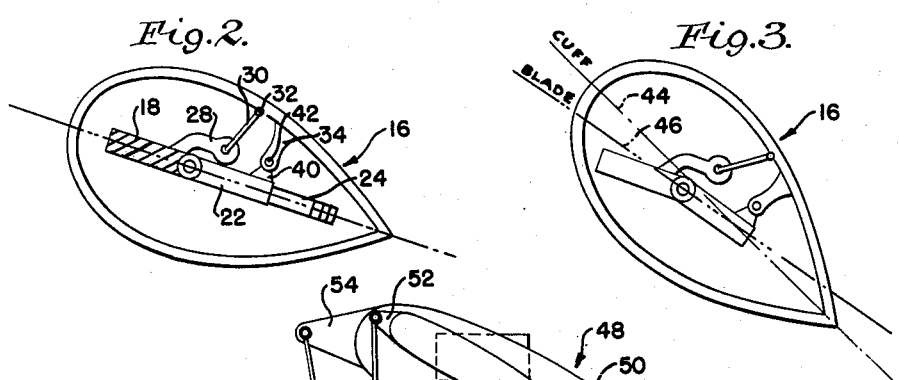 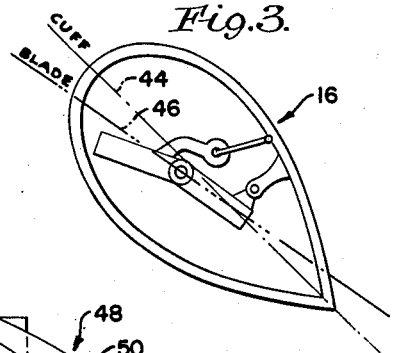
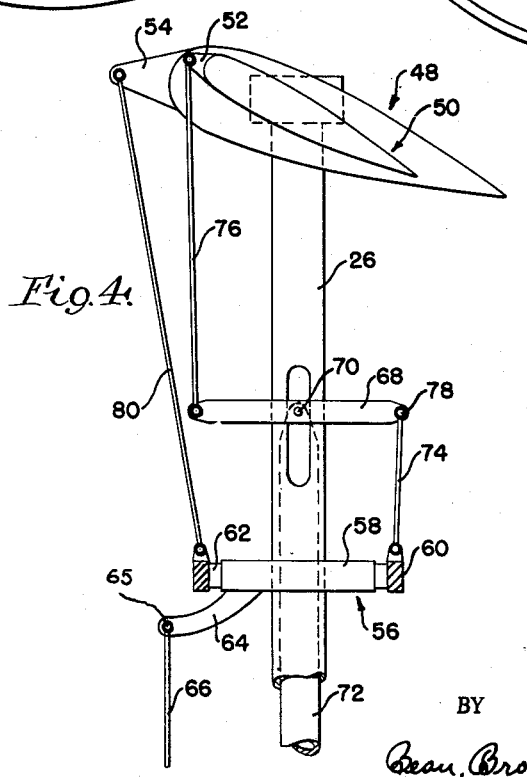
INVENTORS
JAN MEIJER DREES
BARNEY L. BLANKENSHIP
ROBERT R. LYNN
BY
Bean, Brooks, Buckley & Bean
ATTORNEYS

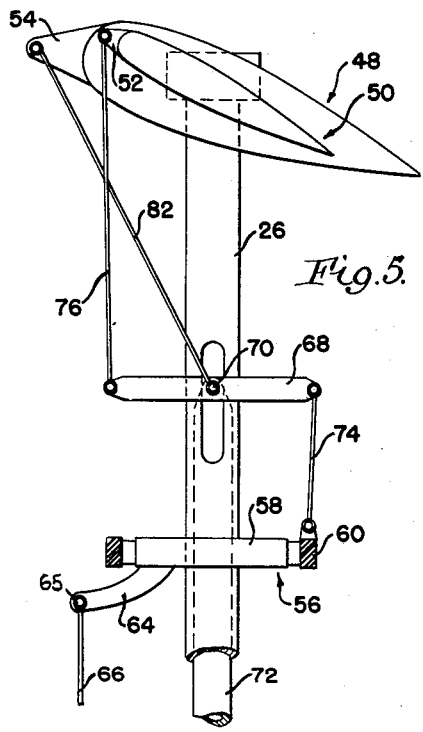
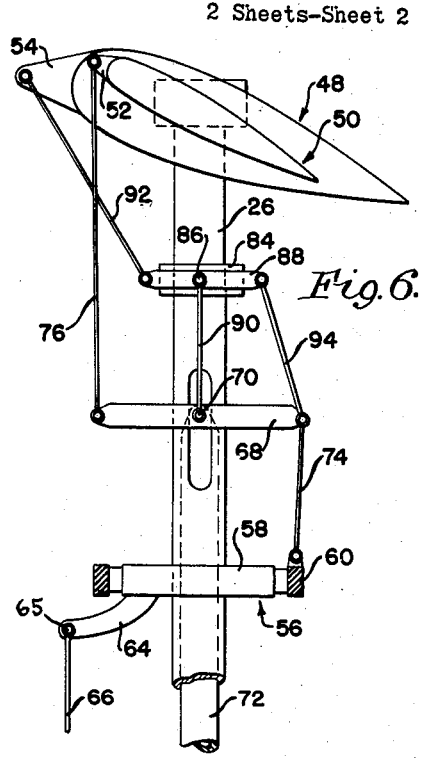
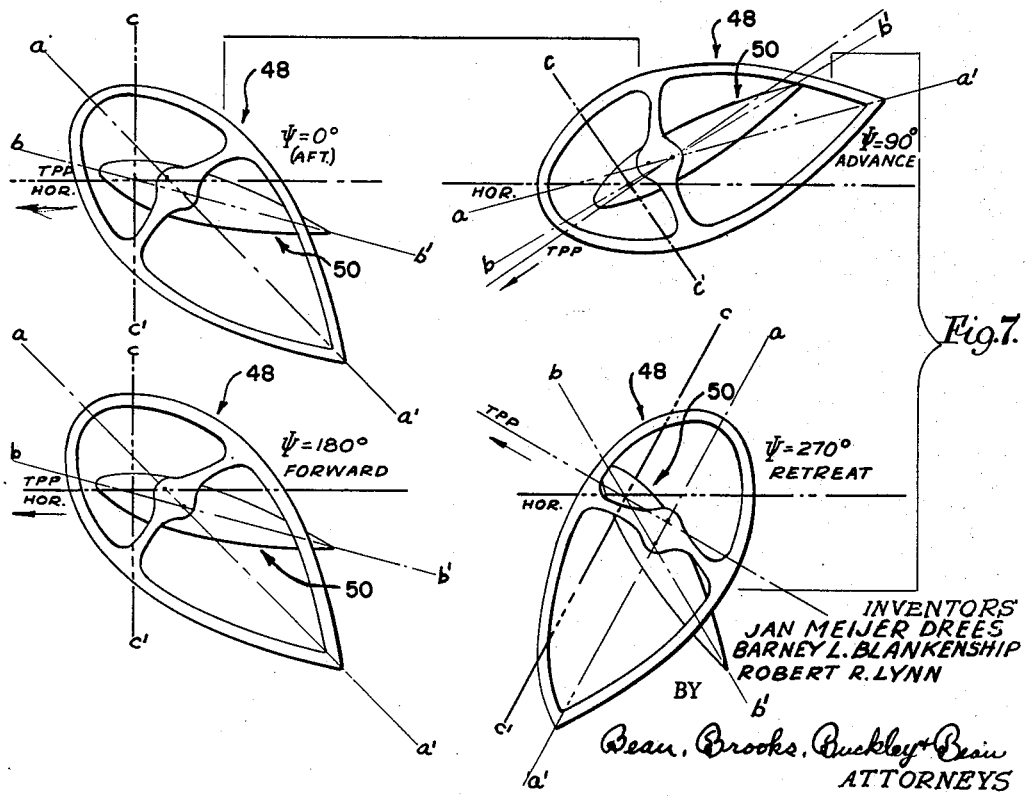

United States Patent Office 3,148,733
Patented Sept. 15, 1964

3,148,733
ROTOR
Jan Meijer Drees, Dallas, Barney L. Blankenship, Hurst, and Robert R. Lynn, Arlington, Tex., assignors to Bell Aerospace Corporation, Wheatfield, N.Y.
Filed Feb. 26, 1963, Ser. No. 261,087
3 Claims. (Cl. 170—160.24)

This invention relates to rotor systems such as are employed in rotary wing aircraft of the helicopter and converti-plane types and in fixed wing aircraft; and pertains in particular to certain improvements in the rotor or propeller blade assemblies thereof.

It is well known that the inner or root end portion of a conventional rotor blade assembly contributes a relatively small amount of thrust to the blade assembly. In fact, in helicopter operation especially, this portion of the rotor assembly can substantially add to negative lift and drag and can give rise to increased oscillatory blade loads and thereby contribute in general to fuselage vibrations; all leading to decreased over-all efficiency.

The present invention is directed to means for modifying the root end portion of a rotor blade assembly, that is in that portion or portions thereof adjacent the rotor center of rotation, to provide increased lift, reduced drag, and reductions in oscillatory blade loads and fuselage vibrations; and in general to more effectively and efficiently utilize the power available to the rotor system. Specifically, the present invention envisages use of means in the form of a cuff of aerodynamically efficient profile which embraces the root end portion of a rotor blade; which cuff is automatically subjected to pitch change movements in an improved mode related to the cyclic and/or collective pitch change movements of the rotor blade proper. By such means, a significant amount of lift is generated at the inboard or root end section of the blade assembly at all azimuthal positions; thereby reducing the overall power required, vertical thrust vibrations, retreating blade stall effects, and oscillary blade loads; thereby permitting the high speed limits of the aircraft to be materially extended.

Accordingly, a primary objective of the present invention is to provide a novel rotor blade assembly, the operation of which is more efficient and effective than in the case of prior art rotor blade assemblies.

Another object of this invention is to provide an aerodynamic device embracing or masking the root end portion or portions of a rotor blade assembly adjacent the center of rotation thereof, which device is subjected to cyclic and/or collective pitch control adjustments which are related to corresponding cyclic or collective pitch control movements of the associated rotor blade, whereby to attain the heretofore mentioned advantages.

More specifically, it is an object of this invention to provide aerodynamic cuff means as aforesaid and pitch control means therefore coupled to the cyclic and collective control of the main rotor blade through linkage systems connecting either directly between the cuff means and the rotor blade or between the cuff means and the main rotor control system.

Other objects and advantages of the invention will appear from the description hereinbelow and the accompanying drawing wherein:

FIG. 1 is a view illustrating a portion of a rotor blade assembly embodying a cuff device of the present invention, showing the cuff means thereof in section and the associated rotor blade root end and driving hub in plan view;

FIG. 2 is a transverse section taken substantially along the plane of section line 2—2 in FIG. 1, and illustrating details of the linkage connection between the cuff and blade assembly;

FIG. 3 is a view similar to FIG. 2 but showing certain relative pitch change movements of the rotor blade and cuff;

FIG. 4 is a side elevational view illustrating a control system coupling the cuff pitch change mechanism to the main blade cyclic pitch control mechanism;

FIG. 5 is a view similar to FIG. 4 but illustrating a control system coupling the cuff pitch change mechanism to the main blade collective pitch control mechanism;

FIG. 6 is a view similar to FIGS. 4 and 5 but showing the cuff pitch control mechanism coupled to both the main blade cyclic and collective pitch control mechanism; and FIG. 7 diagrammatically illustrates four typical azimuthal relative positions of the cuff and rotor blade assemblages, when operating in accordance with this invention.

Referring now more particularly to FIG. 1, the rotor blade assembly 10 illustrated partially therein includes a rotor hub 12, a rotor blade 14, and cuff assembly indicated generally by the reference character 16. The blade 14 is pivotally connected to the radially extending portion 18 of the hub 12 by means of a hinge connection as indicated by reference characters 20; the blade grip 22 and the hub extension 18 being disposed in contiguous relationship as shown to permit of the aforesaid pivotal connections 20 for blade pitch change purposes. The blade 14 is provided with a pitch change horn 24, for cyclic and collective pitch change adjustments of the blade as may be accomplished by mechanism well known in the art.

As can be seen in FIGS. 2 and 3, the cuff 16 is of aerodynamic profile and envelops the inner section or root end portion of the blade assemblage 10; it being appreciated that in multiple rotor blade systems each blade will be similarly equipped with a cuff at its root end as indicated in FIG. 1. In the specific embodiment shown in FIGS. 1, 2 and 3, the cuff 16 is mounted to pivot about the pitch change axis of the blade, and for this purpose is mounted by means of arms directly linked to the blade assembly portion including the extension 18 and the blade grip 22 by means of a linkage system as is shown in FIGS. 2 and 3. For this purpose, the rotor hub extension 18 includes a series of brackets 28 which project therefrom to overlie the blade grip 22 and which provide for the inner pivotal connection thereto of a series of link members such as that indicated by the reference character 30 in FIG. 2. Each link member 30 extends from the bracket 28 to a point of pivotal connection at 32 on the inner side of the cuff 16, substantially as is shown. At the same time, the inner side of the cuff 16, spaced from the point 32 toward the trailing edge thereof is provided with a series of depending bracket members 34 having bifurcated end portions 36, 38 (see particularly FIG. 1) which straddle upstanding ears 40 on the blade grip member 22 and which are pivotally connected thereto as by the pin members 42. By means of such connections, cyclic and/or collective pitch change movements of the blade 14 as may be affected by the pitch control horn 24 at its connection to the conventional control means, is imparted to the cuff or cuffs 16 such as in the manner illustrated in FIG. 3.

It is a particular feature of the present invention as illustrated in FIG. 3 that the pitch change effects which are imparted to the cuff 16 are different from the pitch change effects which are imparted to the blade 14; the variation in pitch change in the case of FIG. 3 being indicated by the lines 44 and 46 respectively which represent the chord lines of the cuff and blade, respectively.

It is a particular feature of the invention as illustrated in FIGS. 1-3 that any pitch change effect imparted to the blade 14 will cause the pitch of the cuff to be altered also.

This is due, of course, to the linkage connections between these members as is shown in FIG. 2. There may be circumstances, however, in which greater freedom of relative movement between cuff and blade is desired. In such circumstances, a cuff may be pivotally mounted on the blade assembly for complete pivotal freedom relative thereto as would be necessary to allow for relative movements such as are shown in FIG. 7 for example, and kinematic constraint of the cuff would then be achieved by separate pitch control linkage members connected thereto. In what follows regarding FIGS. 4–7, the cuff and blade assembly are so connected and kinematic constraint of the cuff is achieved by pitch control linkage connected thereto. Thus, in FIG. 4 wherein reference characters 48 and 50 indicate, generally, the cuff and rotor blade members respectively; the rotor blade is provided with the pitch control horn 52 and the cuff 48 is provided with the pitch control horn 54. The cyclic pitch control for the rotor blade 50 includes the conventional swash plate assembly as indicated generally by the reference character 56 and which includes an inner ring 58 universally connected to the rotor shaft 26, and an outer ring 60 journalled upon the inner ring 58 as by suitable bearing means such as are diagrammatically illustrated at 62. Connected to the inner ring 58 of the swash plate assembly is a control horn 64 linked as at 65 to the mechanism 66 under control of the pilot so that the desired tilt can be effected to the swash plate assembly 56, all as is well known and understood in the art. A scissors link 68 is pivotally connected as at 70 to an inner sleeve member 72 which is vertically movable within the rotor shaft 26 as is conventional and well known in the art for effecting collective pitch control of the rotor blade 50. The outer ring 60 of the swash plate assembly is linked by the member 74 to the scissors link 68 and the opposite end of the scissors link 68 is joined by link 76 to the pitch control horn 52 of the rotor blade 50. As is well understood in the art, collective pitch changes of the rotor blade 50 in coincidence with pitch changes of other blades of the same rotor system are achieved by vertical motion of the sleeve 72 so that the pivotal connection 78 between the link 74 and link 68 forms a fulcrum about which the scissors link 68 rotates to impart a pitch control movement to the rotor blade 50. On the other hand, when cyclic pitch control is desired, the swash plate assembly 56 is pilot controlled to tilt and the pivotal connection at 70 of the scissors link 68 then acts as the fulcrum for imparting the corresponding cyclic pitch motion to the rotor blade 50.

In the embodiment of the present invention as shown in FIG. 4, the pitch control horn 54 of the cuff assembly 48 is connected by means of a link 80 to the outer ring 60 of the swash plate assembly 56. In this fashion, the cuff 48 is coupled to the cyclic pitch change movements of the rotor blade 50 but not to the collective pitch change movements thereof. By suitable selection of linkage lever dimensions, the desired relative amounts of cyclic pitch change which are imparted to the blade and cuff may be obtained.

Referring now to FIG. 5, the arrangement shown therein utilizes the same conventional control means for effecting collective and cyclic pitch control of the rotor blade 50 but the manner of connection between the cuff and the control mechanism is such as to impart only collective pitch control to the cuff means 48. This is accomplished by means or a link 82 which extends between the cuff control horn 54 and the point of pivotal connection at 70 between the scissors link 68 and the sleeve 72. Thus, cyclic pitch change movements of the rotor blade 50 which are effected by movement of the scissors link 68 about the pivot point 70 are not imparted to the cuff means 48. However, whenever the sleeve 72 is moved vertically to effect collective pitch change to the blade 50, such movement is also imparted through the link 82 to the cuff means 48.

FIG. 6 shows still another modification wherein both collective and cyclic pitch control effects are imparted to the cuff means 48. In this case the pitch control means includes a sleeve 84 slidably mounted on the rotor shaft 26 and which pivotally mounts, as at 86, a secondary scissors link 88. Vertical movements of the secondary scissors link 88 are imparted through a link 90 which connects between the pivotal point 70 and the pivotal point 86 so that when collective pitch change of the blade 50 occurs, collective pitch change will also occur with respect to the cuff means 48 through the medium of the link member 92. On the other hand, when the swash plate 56 is tilted to effect pivotal motion of the scissors link 68 about the pivot point 70, the secondary scissors link 88 will also be pivotally moved about its pivot 86 by virtue of the connecting link member 94 which extends between the two scissors links 68 and 88, as shown, so that cyclic pitch change movements will also be imparted to the cuff member 48.

It will be seen that the embodiments as described may constrain the cyclic pitch change of the cuff to be "out of phase," so to speak, relative to the cyclic pitch change of the main rotor blade 50; as may be desirable in some instances of helicopter type operation. For example, it may be desirable to provide a cuff angle of attack of close to 180° at the retreating blade position ($\psi=270°$). To more clearly appreciate this aspect of the invention, reference is had to FIG. 7 wherein four typical azimuthal positions of the blade are illustrated. These four positions are in accord with convention and correspond to aft, advance, forward and retreat positions of the blade wherein the angle $\psi=0°$, 90°, 180° and 270° respectively. The aft position of the blade is, according to convention, rearward relative to the direction of flight; the advance position is transverse to the direction of flight on that side of the aircraft in which the blade is rotating in the direction of flight; the forward position is forward relative to the direction of flight; and the retreating position is transverse to the direction of flight on that side of the aircraft in which the blade is rotating against the direction of flight.

In FIG. 7, the line $a-a'$ in each illustration indicates the chord line of the cuff means 48, the line $b-b'$ indicates the chord line of the rotor blade 50, the line $c-c'$ represents the axis of the rotor mast 26, line TPP indicates the tip-path plane of the rotor as it would appear looking out along the cuff and blade assembly with the arrows indicating the direction of rotation of the blade and, in each illustration the "horizon" is horizontal. The blade pitch angle is the angle between the chord line $b-b'$ and the tip-path plane line TPP, while the cuff pitch angle or angle of attack is that angle between chord line $a-a'$ in the tip-path plane TPP. The difference in pitch between the blade and cuff is, of course, the angle between chord lines $a-a'$ and $b-b'$. In the specific relationship illustrated in FIG. 7, the blade 50 is shown to cycle from 4° in the advance position through 17° in the forward position; 30° in the retreat position, and 17° in the aft position. This corresponds to a collective pitch of 17° of the rotor and a cyclic pitch of ±13°. At the same time, the cuff 48 is shown to cycle through pitch angles of 18° (advance), 45° (forward), 90° (retreat), and 45° (aft); which would indicate, assuming a cycling in usual sinusoidal fashion, of ±36° around a collective pitch setting of 54°. However, it should be appreciated that while sinusoidal, or close to sinusoidal, cycling of the cuff may be obtained by proper disposition of the linkage attachment points between the blade and cuff it is more likely that non-sinusoidal cuff cycling will be desired.

To minimize drag around the entire azimuth, it may be desirable to reduce the cuff angle of attack to small angles around such entire azimuth. It should be recognized that it might be desirable to feather the cuff so that the angle of attack is close to 180° (air flowing over cuff from trailing edge to leading edge) at the retreating position, which relationship would require an especially rapid transition or pitch change of the cuff in the retreat azimuth. In any event, considerable variation in the mode of automatic cycling of the cuff may be achieved as desired, in accord with the present invention.

Although only a few forms of the invention have been specifically illustrated and described in detail hereinabove, it will be understood that various changes may be made without departing from the spirit of the invention or the scope of the accompanying claims.

We claim:

1. In an aircraft, a rotor structure including,
   a rotor shaft,
   a rotor hub carried by said shaft and projecting laterally therefrom,
   a rotor blade having its inner end overlapping and pivotally connected to said hub for pivotal motion relative thereto about the pitch change axis of said blade, with the root of said blade spaced from said shaft,
   means for varying the pitch of said blade,
   an aerodynamic cuff enveloping the portion of said rotor structure between said shaft and the root end of the blade,
   and means for varying the pitch of said cuff in a mode related to but different from pitch change of said blade.

2. In a rotary wing aircraft, in combination,
   a rotor shaft,
   a hub fixed to said rotor shaft for rotation therewith and including an elongate hub extension,
   a blade having an axially elongate blade grip at its inner end, said blade grip and said hub extension being disposed in side-by-side overlapping relation,
   hinge means joining the overlapping portions of said blade grip and said hub extension and pivotally mounting said blade for pitch change movements relative to said hub about an axis extending longitudinally of the blade,
   a cuff member of aerodynamic shape enveloping the overlapping portions of said hub extension and said blade grip,
   means pivotally mounting said cuff to said hub extension for pitch change movements relative thereto,
   means for controlling the pitch of said blade,
   and means for varying the pitch of said cuff in a mode related to and in response to pitch change motion of said blade.

3. In an aircraft as defined in claim 2 wherein the last mentioned means comprises members pivotally joining said cuff to said blade grip.

References Cited in the file of this patent

UNITED STATES PATENTS

| | | |
|---|---|---|
| 2,478,252 | Dean | Aug. 9, 1949 |
| 2,556,710 | Stalker | June 12, 1951 |
| 2,581,773 | Stalker | Jan. 8, 1952 |
| 2,611,344 | Vanderlip et al. | Sept. 23, 1952 |
| 2,627,928 | Mullgardt | Feb. 10, 1953 |
| 2,693,241 | Rasson | Nov. 2, 1954 |
| 2,978,039 | Focke | Apr. 4, 1961 |

FOREIGN PATENTS

| | | |
|---|---|---|
| 606,784 | Great Britain | Aug. 19, 1948 |